United States Patent [19]

Schiessl

[11] Patent Number: 4,512,909
[45] Date of Patent: Apr. 23, 1985

[54] USE OF A HYDROQUINONE COMPOUND WITH HYDRAZINE (1:1 MOLAR RATIO) AS AN OXYGEN-SCAVENGING AND A CORROSION-INHIBITING AGENT

[75] Inventor: Henry W. Schiessl, Northford, Conn.

[73] Assignee: Olin Corporation, Cheshire, Conn.

[21] Appl. No.: 393,831

[22] Filed: Jun. 30, 1982

[51] Int. Cl.³ ............... C09K 15/08; C09K 15/20; C01B 21/16; C02F 1/20
[52] U.S. Cl. ................ 252/188.28; 252/392; 252/393; 423/219; 423/407
[58] Field of Search ........... 252/188.28, 188.1, 387, 252/388, 389.1, 393, 392; 423/219, 407

[56] References Cited

U.S. PATENT DOCUMENTS

| | | | |
|---|---|---|---|
| 3,551,349 | 12/1970 | Kallfass | 252/392 |
| 3,843,547 | 10/1974 | Kaufman | 252/184 |
| 3,983,048 | 9/1976 | Schiessl et al. | 252/178 |
| 4,012,195 | 3/1977 | Noack | 106/14.13 |
| 4,022,711 | 5/1977 | Noack | 252/188.28 |
| 4,022,712 | 5/1977 | Noack | 252/188.28 |
| 4,026,664 | 5/1977 | Noack | 252/389 R |
| 4,079,018 | 3/1978 | Noack | 252/188.28 |
| 4,096,090 | 6/1978 | Noack | 252/390 |
| 4,269,717 | 5/1981 | Slovinsky | 210/750 |
| 4,278,635 | 7/1981 | Kerst | 422/14 |
| 4,279,767 | 7/1981 | Muccitelli | 252/178 |
| 4,282,111 | 8/1981 | Ciuba | 252/178 |

Primary Examiner—Teddy S. Gron
Assistant Examiner—Virginia B. Caress
Attorney, Agent, or Firm—William A. Simons; Thomas P. O'Day

[57] ABSTRACT

Disclosed is an improved oxygen-scavenging and corrosion-inhibiting agent for fluidic systems comprising a hydroquinone compound with hydrazine (1:1 molar ratio). Also disclosed are methods for using this agent.

7 Claims, No Drawings

USE OF A HYDROQUINONE COMPOUND WITH HYDRAZINE (1:1 MOLAR RATIO) AS AN OXYGEN-SCAVENGING AND A CORROSION-INHIBITING AGENT

BACKGROUND OF THE INVENTION

1. Field of the Invention

The present invention relates to the use of a hydroquinone compound with hydrazine (1:1 molar ratio) as an oxygen-scavenger and corrosion-inhibitor in fluidic systems.

2. Description of the Prior Art

Dissolved oxygen in fluids such as water may promote extensive pitting and other forms of corrosion to metal surfaces coming in contact with these fluids. For example, this corrosion may cause serious problems such as metal failure to boiler systems, hot water heating systems, and the like.

Accordingly, removal of oxygen from fluidic streams and systems is highly desirable in many instances. Such deoxygenation can be carried out by either mechanical or chemical means or with both. In those situations where chemical deoxygenation is desired, various chemicals including sodium sulfite, hydrazine, and hydroquinone have been employed as chemical oxygen-scavengers. See U.S. Pat. Nos. 3,551,349 (Kallfass); 3,843,547 (Kaufman et al); 3,983,048 (Schiessl); 4,012,195 (Noack); 4,022,711 (Noack); 4,022,712 (Noack); 4,026,664 (Noack); 4,079,018 (Noack); 4,096,090 (Noack); and 4,269,717 (Slovinsky) as teaching of the use of hydrazine or similar compounds as oxygen-scavengers and corrosion-inhibitors. See U.S. Pat. Nos. 4,278,635 (Kerst); 4,279,767 (Muccitelli); and 4,282,111 (Ciuba) as teaching of the use of hydroquinone and the like as an oxygen-scavenger. All of these cited U.S. patents are incorporated herein by reference in their entireties.

Hydrazine, with or without one or more catalysts, has long been used as an oxygen-scavenger to remove dissolved oxygen in liquid systems such as boilers and hot water heating systems. The products of the hydrazine-oxygen reaction are nitrogen and water. Thus, no solids are added to the liquid system. Besides the oxygen-scavenging effect, hydrazine has a number of desirable effects in such systems. For example, it promotes passivation of steel surfaces, primarily by formation of magnetite surface coatings. In its reaction with red iron oxide to form magnetite, the by-products are also nitrogen and water, two innocuous substances. Decomposition of hydrazine in such systems also produces ammonia, whose alkaline effect on steam and condensate systems may be beneficial in some instances.

However, hydrazine is a liquid with appreciable vapor pressure even at ambient temperatures and in aqueous solutions. For example, when an aqeuous solution containing about 35% by weight $N_2H_4$ is allowed to equilibrate with its vapor in a closed space, there may be up to 500 parts by volume per million parts of air in the vapor space over the solution. Moreover, hydrazine is toxic to humans by skin contact and by inhalation. The inhalation toxicity may be aggravated by the vapor pressure of hydrazine, depending upon the use. Accordingly, precautions should be taken in the workpiece to obviate the possibilities of skin contact and inhalation of hydrazine. Furthermore, the hydrazine-oxygen reaction is very slow at low operating temperatures such as room temperature. In those cases, one or more catalysts must be added to the system with the hydrazine.

Hydroquinone itself is also a known oxygen-scavenger. However, it also has certain disadvantages. It has the obvious disadvantage of adding dissolved solids to the system being treated. It also has the further disadvantage of being costly in terms of reducing effectiveness (i.e., much greater amounts of it are needed for an equivalent oxygen-scavenging function as compared to hydrazine). Furthermore, there is no known practical way to measure its residual concentration in commercial fluidic systems being treated.

As mentioned above, the rate of reaction between hydrazine and oxygen at room temperature is relatively low. Thus, the corrosion-inhibiting effect of hydrazine on metal surfaces may be unsatisfactory. For this reason, it has been proposed in the past to add catalysts or activators with the hydrazine to greatly accelerate the rate of reaction between hydrazine and oxygen, especially at room temperature. Among the known catalysts are the following:

| | Catalyst | Reference |
|---|---|---|
| 1. | water-soluble o-and p-quinone compounds | U.S. Pat. No. 3,551,349 (Kallfass) |
| 2. | mixture of an aryl amine compound and a quinone compound | U.S. Pat. No. 3,843,547 (Kaufman, Schiessl, and Csejka) |
| 3. | an aryl amine compound | U.S. Pat. No. 3,983,048 (Schiessl, Kaufman, and Csejka) |
| 4. | an organometallic complex which is the reaction product of a cobaltous, manganous, or cupric inorganic salt and one or more ortho aromatic ligands containing at least one amino and one hydroxy group | U.S. Pat. No. 4,012,195 (Noack) |
| 5. | a mixture of a quinone compound and an organometallic complex which is the reaction product of a cobaltous, manganous, or cupric inorganic salt and one or more ortho aromatic ligands containing at least one amino and one hydroxy group | U.S. Pat. Nos. 4,026,664 and 4,096,090 (Noack) |
| 6. | an organometallic complex which is the reaction product of a cobaltous, manganous, or cupric inorganic salt and one or more ligands comprising amino derivatives of carboxylic acids or salts | U.S. Pat. No. 4,022,712 (Noack) |
| 7. | a mixture of a quinone compound and an organometallic complex which is the reaction product of a cobaltous, manganous, or cupric inorganic salt and one or more ligands comprising amino derivatives of carboxylic acids or salts | U.S. Pat. Nos. 4,022,711 and 4,079,018 (Noack) |

In spite of all these teachings it is still desirable to find a new oxygen scavenger which retains all of the benefits of hydrazine and hydroquinone, yet removes one or more of above-noted undesirable effects of these compounds without the use of catalysts.

The present invention achieves such a solution to this need by providing (1) a non-volatile derivative of hydrazine which can be handled in the workpiece without the danger of inhalation but which, in the boiler or hot water system or the like, functions better than free hydrazine and (2) incorporates the additional benefits of hydroquinone without introducing excessive amounts of dissolved solids which may result from normal use of this reagent.

Furthermore, while this work with hydrazine and hydroquinone was going on, no one until the present invention recognized that the reaction product of hydrazine and hydroquinone could be employed as an oxygen-scavenger. In fact, H. Kallfass in U.S. Pat. No. 3,551,349, apparently thought these compounds could not and should not react (see column 2, lines 23–31 of this patent).

BRIEF SUMMARY OF THE INVENTION

Accordingly, the present invention is directed to an oxygen-scavenging and corrosion-inhibiting composition for protecting metal surfaces against corrosion from oxygen-containing fluidic systems in contact therewith comprising a hydroquinone compound with hydrazine having a molar ratio of 1:1 of hydroquinone to hydrazine, which is formed by reacting hydroquinone and hydrazine in a mole ratio of at least about 0.75:1. The present invention is also directed to a method for scavenging oxygen and for protecting metal surfaces against corrosion caused by oxygen-containing fluidic systems in contact therewith comprising adding an effective amount of this hydroquinone compound with hydrazine (1:1 molar ratio) to the fluidic system to scavenge at least a portion of the oxygen contained therein and to inhibit corrosion on the metal surfaces in contact therewith.

DETAILED DESCRIPTION

The reaction of hydrazine with hydroquinone is believed to occur through the following reaction (A):

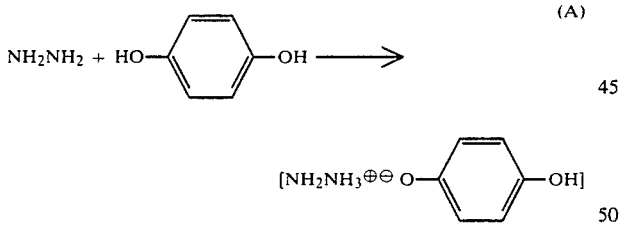

However, the exact structural formula of this hydroquinone compound of hydrazine is not yet known. Preferably, this compound or adduct may be made by reacting hydroquinone with hydrazine in a mole ratio in the range from about 0.90:1.0 to about 1.25:1.0. More preferably in the range from about 1.0:1.0 to about 1.1:1.0. Preferably, this reaction occurs in the presence of a solvent such as water or an alcohol like ethanol and the resulting solid reaction product will precipitate from the reaction mixture and then be separated and recovered. The solid compound may be dissolved in water. Alternatively, this compound may be first formed in a liquid solution by reacting hydrazine and hydroquinone in an aqueous solution.

Whether or not a solid or liquid product is desired, the two components of this compound may advantageously be combined and reacted at room temperature and at atmospheric pressure. However, lower or higher temperatures and negative or positive pressures may be employed, if desired. Thus, temperatures ranging from about 10° C. or lower to about 100° C. or higher, preferably from about 20° C. to about 50° C., and under a wide range of pressures, preferably atmospheric pressure may be used. At any rate, it can be seen that any combination of temperature and pressure may be used in preparing the compound or adduct provided that there are no significant detrimental effects on the reaction or on the desired reaction product.

The reaction of the hydrazine and the hydroquinone is essentially instantaneous or occurs within a reasonably short time (i.e., under 1 hour). When the solid product is desired, it may be separated from the alcoholic or aqueous reaction mixture by any conventional means (e.g., by filtration or by distillation of the solvent).

This compound is stable in the absence of air (e.g., in closed containers). Furthermore, the compound, as a solid or in aqueous solution, gives off essentially no hydrazine vapor.

According to the method of the present invention, an effective amount of the compound is added and admixed with the oxygen-containing fluid by a suitable mixing technique such as mechanical agitation or the like in order to lower the oxygen concentration of the treated fluid. For example, at room temperature and pressure, an aqueous solution saturated with oxygen in an atmosphere of air contains about 8 to 9 parts oxygen ($O_2$) per million parts of $H_2O$. Such aqueous solutions may be treated by the method of this invention to reduce the oxygen concentration to a range from about 1 to about 10 parts per billion or lower at operating conditions.

Generally, a sufficient amount of the compound is added to the oxygen-containing fluid so that its concentration, after admixing, but before reaction with the dissolved oxygen takes place, is from about 0.01 to about 1000, preferably from about 0.1 to about 100, parts of the compound per million parts of fluid. Greater proportions may be employed if desired. These proportions have been found to be effective in the treatment of boiler water in a boiler operated at pressures up to about 400 psig and at temperatures ranging from about 25° C. to about 400° C. However, the same proportions may be used in refrigeration systems and other oxygen-containing fluids at temperatures down to 0° C., or less. In any event, the amount of active compound required to effectively scavenge oxygen from a fluid such as boiler water is dependent upon the amount of oxygen actually present therein. It is generally desirable that at least 0.67 moles of this hydroquinone compound with hydrazine (1:1) be used per mole of oxygen ($O_2$). Of course, levels of this compound far in excess of 0.67 moles per mole of $O_2$ may be required in certain systems, especially static storage systems. In those cases, treatment levels of 100 moles or more per mole of oxygen may be effective.

In the case of boiler systems, the active compound of this invention may be added at any point. It is most efficient to treat the boiler feed water, preferably as it comes from the deaerator. Residence times prior to steam formation should be maximized to obtain maximum corrosion protection. Preferable residence times may range from about 2 minutes to about 20 minutes.

Besides removing oxygen from boilers, the compound may also be used in other aqueous systems such as hot water systems, oil wells using water injection systems, and the like. The compound may be also used in other quiescent and running bodies of water such as in industrial plants or in long distance heating supply systems. Since the compound is consumed during oxygen removal, the concentration of hydrazine of the treated liquid should be determined periodically and additional compound of the present invention should be added to maintain the concentration of the compound at an effective amount.

Besides aqueous systems, the process of the present invention may be used to remove oxygen and reduce or inhibit corrosion in inorganic and organic liquid and gas systems (e.g., heat exchange systems employing glycol coolant systems).

While the exact mechanism through which the removal of oxygen by this compound is not clearly understood, it is believed that this compound acts by first having the hydroquinone portion of the compound react with $O_2$ to form quinone and water and then the quinone is reduced by the hydrazine portion back to hydroquinone, which reacts with more $O_2$. An operating benefit of this invention in boiler or hot water applications is that it is only necessary to analyze for residual hydrazine. As long as residual hydrazine is maintained, the reduction of quinone to hydroquinone is assured. Simple methods for analyzing residual hydrazine in boilers and the like are well known in the art while hydroquinone is more difficult, if not impossible, to accurately analyze under boiler operating conditions.

Also, as used herein in both the specification and claims, the terms "fluidic", "aqueous", "water", "aqueous systems", and the like when defined to mean oxygen-containing fluids and water to which protection against corrosion is sought, are intended to include not only fluids or water in liquid form, but also as fluids or water in vapor form, including steam and aqueous solutions for cooling systems.

The following examples are presented to further illustrate the invention. All parts and percentages are by weight unless explicitly stated otherwise.

EXAMPLE 1

Preparation of Hydroquinone Compound with Hydrazine (1:1 Molar Ratio)

A solution of hydroquinone (150 grams, 1.36 moles) in 2B denatured ethanol (500 milliliters) was added to a stirred reaction vessel having a nitrogen blanket. Next, a 64 wt.% aqueous solution of hydrazine (75 milliliters, 1.5 moles) was added to the vessel. This reaction mixture was allowed to stir for a few minutes and then filtered. The resulting filter cake was washed with 2B denatured ethanol and dried at 50° C. under a vacuum. The yield was 83.4% by weight, based on the amount of hydroquinone employed. The remaining product stayed dissolved in the ethanol filtrate and is recoverable by reusing the solvent in a subsequent reaction.

The solid product had the following elemental analysis: Analyzed for $C_6H_{10}N_2O_2$ as shown in reaction (A):

|  | C | H | N |
|---|---|---|---|
| Found (% by weight): | 50.45% | 6.89% | 19.98% |
| Theory (% by weight): | 50.69% | 7.09% | 19.71% |

Further analysis by spectroscopic examination in the infrared region showed a stretching vibration for a $-NH_3^+$ group at 2500 wave numbers and a bending vibration at 1480 wave numbers. An X-ray pattern showed no free hydroquinone. In all, this data indicated that a hydroquinone compound or adduct with hydrazine (1:1 molar ratio) was made with a formula $C_6H_{10}N_2O_2$ and a probable structure as given in reaction (A).

EXAMPLE 2

Bench Scale Deoxygenation Studies

The following experimental laboratory work shows that the above-made compound is an effective deoxygenation agent at ambient temperature (i.e., at about 20° C. to about 25° C.).

These deoxygenation measurements were run in one liter round bottom flasks each equipped with a small septum-covered side arm and a standard taper joint into which was inserted the probe of an oxygen meter (Model 54 made by Yellow Springs Instrument Co. of Yellow Springs, Ohio). For each test, the flask was filled with air-saturated, buffered (with $Na_2CO_3/NaHCO_3$ to a pH of 9.5) distilled or deionized water. The amount of dissolved $O_2$ content in the water was about 8 parts per million parts of $H_2O$ by weight (about $2.4 \times 10^{-4}$ moles per liter).

After filling the flask with water, the probe was inserted into the flask and an aqueous solution containing the compound made according to Example 1 was injected through the septum-covered side arm with a hypodermic needle.

The rate of dissolved oxygen disappearance was observed on a YSI meter and recorded on a strip chart. The times for removal of 90% by weight of the oxygen ($T_{9/10}$) were noted. This experiment was repeated, with other known oxygen scavengers, namely, hydrazine, hydroquinone, and hydrazine catalyzed with hydroquinone[1] and hydrazine catalyzed with both methylhydroquinone and a Co-ETDA ligand[2]. These results are shown in Table I, below. The following equivalent weights were calculated for hydrazine, hydroquinone, and hydroquinone compound with hydrazine:

| Compound | Equivalent Weight |
|---|---|
| Hydrazine | 8 grams |
| Hydroquinone | 55 grams |
| Hydroquinone compound with Hydrazine (1:1) | 23.67 grams |

TABLE I

| Oxygen-Scavenger | ppm (by wt) | Time for 90% Dissolved $O_2$ Removal, Minutes ($T_{9/10}$) |
|---|---|---|
| Hydroquinone compound with Hydrazine (1:1) | 483 | 0.19 minutes |
| Hydroquinone compound with Hydrazine (1:1) | 98 | 0.25 minutes |
| Hydrazine (no catalyst) | 150 | not effective |
| Hydroquinone | 1080 | 1.19 minutes |
| Catalyzed Hydrazine | 150 | 3.0 minutes |

TABLE I-continued

| Oxygen-Scavenger | ppm (by wt) | Time for 90% Dissolved $O_2$ Removal, Minutes ($T_{9/10}$) |
|---|---|---|
| (Hydroquinone)[1] Catalyzed Hydrazine (methyl hydroquinone + Co-ETDA)[2] | 150 | 0.44 minutes |

[1]This catalyzed hydrazine product is 35% by weight hydrazine and 0.2% by weight hydroquinone.
[2]This catalyzed hydrazine product is SCAV-OX ® Plus made by Olin Corporation of Stamford, Connecticut, and contained less than .0017 mole of methyl hydroquinone per mole of hydrazine.

This data shows that the present hydroquinone compound with hydrazine is superior to either hydrazine or hydroquinone per se or hydrazine catalyzed with a small amount of hydroquinone at similar levels of reducing equivalency (levels of 1080 ppm hydroquinone and 483 ppm hydroquinone compound with hydrazine are equivalent to 150 ppm hydrazine). Furthermore, even when this hydroquinone compound with hydrazine is present at only one-fifth the reducing equivalency (i.e., at 98 ppm), it is better than hydroquinone and catalyzed hydrazine products.

EXAMPLE 3

Deoxygenation Studies in Commercial Steam Boilers

The boilers used were three Riley water tube natural-circulation oil-fired units in parallel with superheaters. Their capacities were 75,000 lb steam/hr (Boilers 1 and 2) and 100,000 lb steam/hr (Boiler 3). The design capacity of these units was 650 psig with the ability to go to 725 psig. Design temperature was 750° F. (superheated steam). During the course of these trials the saturated steam pressure varied from about 180 to about 260 psig, due to the changing steam demand in the plant.

The water used in these boilers was city water softened by passing through a cation exchanger and then mechanically deaerated in two spray-type Cochrane deaerators.

An aqueous solution of the oxygen scavenger [hydroquinone compound with hydrazine (1:1 molar ratio)] was fed into the storage section of the Cochrane deaerators. The rate of active compound pumped into the boiler system depended upon the amount of oxygen in the system. The aim was to provide enough active compound to maintain about 0.1 ppm $N_2H_4$ (varied from about 0.06 to about 0.15 ppm) in the feedwater to the boiler. The residual hydrazine may be easily measured in the feedwater and, in turn, the amount of oxygen-scavenger fed may be adjusted to maintain the above-mentioned residual.

The condensed steam was sampled and analyzed for ammonia by the Nessler method. The average $NH_3$ levels were about 0.1 to about 0.2 ppm. These values were about the same as when hydrazine per se was used as an oxygen-scavenger in similar trails. In fact, the same $NH_3$ values were found when catalyzed sulfite was used as an oxygen-scavenger in similar trials in the same boilers indicating that neither $N_2H_4$ nor hydroquinone compound with hydrazine (1:1) contributes significant amounts of $NH_3$ over and above that entering with the make-up water. Furthermore, no oxygen was found in the generated steam from the boiler. This indicated that the oxygen-scavenger was effective in removing all of the remaining dissolved oxygen from the boiler system.

EXAMPLE 4

Bench Scale Corrosion Tests

Metal coupons (steel, copper, brass, bronze, and admiralty) were individually placed in separate 500 ml flasks containing water (buffered to a pH of 8.5 with $Na_2CO_3/NaHCO_3$ buffer). Selected amounts of hydroquinone compound with hydrazine (1:1) were placed into each flask. The flasks were then allowed to stand for a period of 4 weeks. The corrosion rates, in mils per year (mpy), were measured and are summarized in Table II. As can be seen, the amount of corrosion for each metal was very small.

TABLE II

| | Amount of Hydroquinone Compound with Hydrazine (1:1) | |
|---|---|---|
| Metal | Equivalent to 300 ppm $N_2H_4$ | Equivalent to 2000 ppm $N_2H_4$ |
| Steel | 0.028 mpy | 0.015 mpy |
| Copper | 0.069 mpy | 0.019 mpy |
| Brass | 0.019 mpy | 0.015 mpy |
| Bronze | wasn't done | 0.035 mpy |
| Admiralty | 0.054 mpy | 0.018 mpy |

EXAMPLE 5

Boiler Scale Corrosion Tests

During the boiler trials mentioned in Example 3, a trombone pipe rack was connected to the feed water line between the deaerators and the boilers. Standard corrosion coupons were installed onto the pipe elbows with plastic holders, nuts, and bolts. The coupons were removed after the trial and the rate of corrosion, in mils per year, was calculated. The results are given in Table III. As can be seen, the rates are low.

TABLE III

Corrosion Rates in Boiler Employing Hydroquinone Compound with Hydrazine (1:1) as an Oxygen-Scavenger

| Metal | Corrosion (mpy) |
|---|---|
| Mild Steel | 0.90 |
| Copper | 0.009 |
| Brass | 0.041 |
| Admiralty | 0.021 |
| Bronze | 0.051 |

EXAMPLE 6

Toxicity Tests

The oral $LD_{50}$ in rats for hydroquinone compound with hydrazine (1:1) was 0.34 g/Kg of body weight. The dermal $LD_{50}$ in rabbits, determined by applying 2 g of compound/Kg of body weight, was greater than 2 g/Kg of body weight. The inhalation $LC_{50}$ in rats, determined by exposing the animals to 200 mg of compound/liter of air, was greater than 200 mg/l.

In summary, the compound has some oral toxicity, but is not considered toxic dermally nor by inhalation. This is important because in the factory situation, exposure to the compound is most likely to occur by dermal contact or by inhalation. It is not likely that personnel would orally digest the compound under regular working conditions.

EXAMPLE 7

Mutagenic Test

The compound of the present invention was analyzed for mutagenic activity using the standard short term bacterial test for genetic toxicity called the Ames Salmonella/Microsome Plate Assay. No mutagenic effect was detected with this compound.

EXAMPLE 8

Storage Stability Test

An aqueous solution (60 ml) containing 7.3% by weight hydroquinone compound with hydrazine (1:1) was placed in a polyethylene bottle capped with a glass tube attached to a gas burette. The bottle was placed in an oven heated at 50° C. The amount of gas evolved by decomposition of the active compound was measured. After about 115 hrs., only 4 ml of evolved gas was measured. This indicates that the compound is relatively stable at temperatures above ambient and should be even more stable at ambient temperatures (20°-25° C.).

What is claimed is:

1. An oxygen-scavenging and corrosion-inhibiting composition for protecting metal surfaces against corrosion from oxygen-containing fluidic systems in contact therewith comprising a hydroquinone compound with hydrazine (1:1 molar ratio) which is formed by reacting hydroquinone and hydrazine in a mole ratio of at least about 0.75:1 about 0.75:1, said compound being spectroscopically characterized by a stretching vibration for a $-NH_3^+$ group at 2500 wave numbers and a bending vibration at 1480 wave numbers.

2. The oxygen-scavenging and corrosion-inhibiting composition of claim 1 wherein said hydroquinone compound with hydrazine (1:1) is a solid.

3. The oxygen-scavenging and corrosion-inhibiting composition of claim 1 wherein said hydroquinone compound with hydrazine (1:1) is an aqueous solution.

4. A method for scavenging oxygen and for protecting metal surfaces against corrosion caused by contact of an oxygen-containing fluid therewith comprising
adding an effective amount of a hydroquinone compound with hydrazine (1:1 molar ratio) to the fluidic system to scavenge at least a portion of the oxygen contained therein and to inhibit corrosion on the metal surfaces in contact therewith, said compound being formed by reacting hydroquinone and hydrazine in a mole ratio of at least about 0.75:1, and said compound being spectroscopically characterized by a stretching vibration for a $-NH_3^+$ group at 2500 wave numbers and a bending vibration at 1480 wave numbers.

5. The method of claim 4 wherein said fluidic system is an aqueous system.

6. The method of claim 5 wherein said aqueous system is a boiler water system.

7. The method of claim 4 wherein the amount of hydroquinone compound with hydrazine (1:1) added to said fluidic system is from about 0.01 to about 1000 parts by weight of the compound per million parts of fluid.

* * * * *